UNITED STATES PATENT OFFICE.

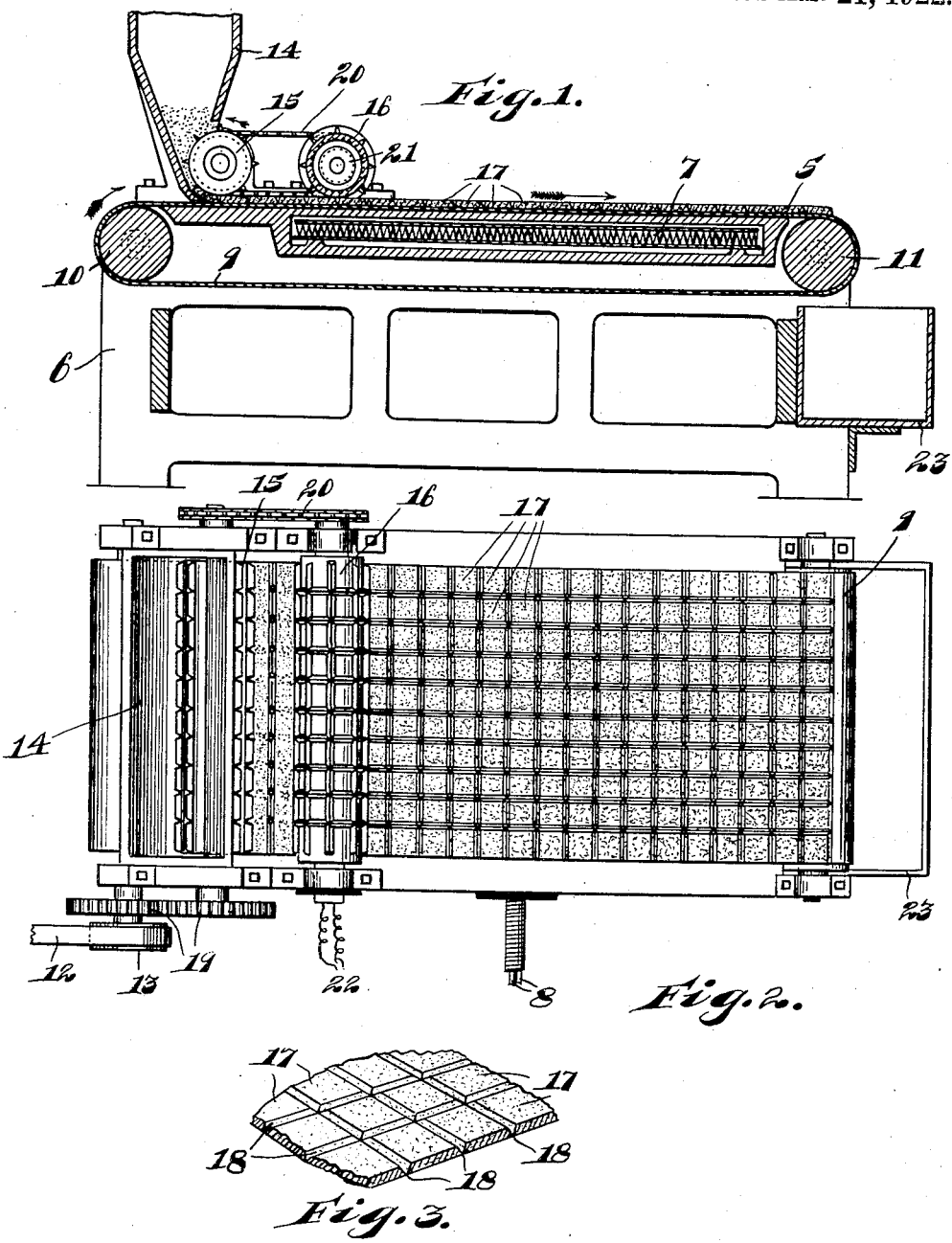

FREDERICK A. COOLEY, OF WEST McHENRY, ILLINOIS.

PROCESS FOR MANUFACTURING FEED FOR LIVE STOCK AND POULTRY.

1,409,998.  Specification of Letters Patent.  Patented Mar. 21, 1922.

Application filed January 31, 1919. Serial No. 274,326.

*To all whom it may concern:*

Be it known that I, FREDERICK A. COOLEY, a citizen of the United States, and a resident of West McHenry, county of McHenry, and State of Illinois, have invented a certain new and useful Process for Manufacturing Feed for Live Stock and Poultry, of which the following is a specification.

My invention relates to a process for producing a feed for live stock and poultry, and has for its object the production of a process through the medium of which a feed may be produced in connection with which there will be practically no loss in the feeding of the live stock or poultry.

It is generally known that where feed is in small hard pieces, such as shelled corn, there is very little wastage in the feeding operation, inasmuch as the stock or poultry, in the event of dropping a kernel, will invariably find the same and thus prevent any wastage. With ground or granulated feed, however, in the event of the same being dropped to the ground, as through spilling over the sides of the feed trough, very little of the feed is recovered, practically all of the feed thus dropped to the ground becoming wastage, inasmuch as the live stock or poultry will make no effort to recover the same.

It is the object of this invention to provide a granulated composition feed which will be formed into small hard pieces resembling, for instance, kernels of grain, to insure against wastage as above pointed out.

Other objects will appear hereinafter.

With these objects in view, the invention consists in the process hereinafter described and claimed.

The invention will be best understood by reference to the accompanying drawing forming a part of this specification, and in which Fig. 1, is a vertical longitudinal section through a molding and heating or drying machine employed in the process, Fig. 2, a top plan view thereof, and Fig. 3, a fragmentary perspective view of a portion of the feed substance after being passed through the machine.

In the employment of my process, I contemplate using a table 5 having a suitable supporting under structure 6. In said table 5 is arranged an electrical heating element 7, the feed wires of which are shown at 8. Arranged for travel over the table 5 is an endless carrier 9 which passes around rollers 10 and 11, as seen. Driving of said carrier 9 is effected by means of a power driven belt 12, which engages with a pulley 13 provided on roller 10.

Arranged above the table 5, at one end thereof, is a hopper 14 at the discharge end of which is provided a roller 15 having a recessed periphery, the roller 15, in the operation of the machine, being adapted to carry the granulated feed contained in the hopper 14 downwardly and deposit the same onto the carrier 9, whence the same is carried under a second roller 16 also having a recessed periphery adapted to mold or cut the substance passed thereunder into a plurality of small squares or rectangular pieces 17, said squares or pieces 17 being connected together by weakened joints 18.

The roller 15 is operatively connected with the roller 10 by meshing gears 19, and the rollers 15 and 16 are operatively connected together by a sprocket chain 20.

Within the roller 16 is an electrical heating element 21, the feed wires of which are connected at 22.

In carrying out my process, the solid food, such as seeds or grains which are to constitute the ingredients of the feed, are first ground or reduced to granulated form. This granulated substance is then mixed with water, or other suitable liquid, to produce a mixture of plastic consistency resembling dough. The ingredients are then thoroughly mingled by agitation, whereupon the same are deposited into the hopper 14. From the hopper 14 the mixture will be automatically withdrawn and spread in a thin sheet over the table 5. This sheet will be molded or cut up into small squares or small pieces of any desired formation by reason of the recessed formation of the rollers 15 and 16. As the mixture passes onto the table 5 and under the roller 16, the same will be heated, effecting partial cooking or baking thereof and drying, so that the substance will become hard and rendering it susceptible to be readily broken at the weakened joints between the pieces 17. As the recessed or divided sheet is discharged from the end of the table, the same, or the small pieces 17 of which the same is composed, will drop into a suitable receptacle 23, whence the same may be removed for the feeding of live stock and poultry, as before mentioned.

While I have illustrated and described the preferred process for carrying my invention into effect, this is capable of variation and modification without departing from the spirit of the invention. I, therefore, do not wish to be limited to the precise process of manufacture set forth, but desire to avail myself of such variations and modifications as come within the scope of the appended claims.

Having described my invention, what I claim as new and desire to secure by Letters Patent is:—

A process of manufacturing feed for live stock and poultry which consists in first mixing together ingredients of the solid food used and reducing the same to granulated form, then mixing the same with a liquid to produce a mixture of plastic consistency, then passing said plastic mixture between two opposed surfaces one of which is a molding surface and both of which are heated, to form said material into a plurality of comparatively small hard pieces, and then passing the material over an elongated flat heated surface for completely drying the same before discharge, substantially as described.

In testimony whereof I have signed my name to this specification in the presence of two subscribing witnesses.

FREDERICK A. COOLEY.

Witnesses:
 VERONA NIESEN,
 GERALD J. CAREY.